(12) United States Patent
McIntyre

(10) Patent No.: US 7,075,586 B2
(45) Date of Patent: Jul. 11, 2006

(54) POWER-ON DETECTION OF DVI RECEIVER IC

(75) Inventor: Larry Wayne McIntyre, Zionsville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 549 days.

(21) Appl. No.: 10/339,747

(22) Filed: Jan. 9, 2003

(65) Prior Publication Data
US 2003/0197808 A1  Oct. 23, 2003

Related U.S. Application Data

(60) Provisional application No. 60/370,013, filed on Apr. 3, 2002.

(51) Int. Cl.
*H04N 5/46* (2006.01)

(52) U.S. Cl. .................. 348/558; 348/730; 348/554

(58) Field of Classification Search ............. 348/554, 348/558, 553, 555, 730, 552, 571, 725, 231.7, 348/231.9, 705, 706; 710/8, 15, 16, 17; H04N 3/27, H04N 5/46
See application file for complete search history.

(56) References Cited

U.S. PATENT DOCUMENTS

| | | | | |
|---|---|---|---|---|
| 5,371,553 A | * | 12/1994 | Kawamura et al. | 348/588 |
| 5,511,986 A | | 4/1996 | Casey et al. | 439/188 |
| 5,742,339 A | * | 4/1998 | Wakui | 348/231.9 |
| 5,912,618 A | | 6/1999 | Maugars | 340/520 |
| 5,982,414 A | * | 11/1999 | Yoshida et al. | 348/552 |
| 6,515,697 B1 | * | 2/2003 | Yamada et al. | 348/231.6 |
| 6,590,609 B1 | * | 7/2003 | Kitade et al. | 348/231.6 |

OTHER PUBLICATIONS

Article by Silicon Image, SiI907 Digital CRT Controller Datasheet, Document No. SiI-DS-0044-05, pp. 1-14.
Article by Sanyo Electro co., Ltd. Semiconductor Company, LA79500E—6 input 3-output Audio/Video Switch, Tentative, dated Jan. 12, 2001, 14 pages.
Explanation of Prior Art shown in the Enclosed Figure, two page explanation.

* cited by examiner

*Primary Examiner*—Sherrie Hsia
(74) *Attorney, Agent, or Firm*—Joseph J. Laks; Robert B. Levy; Joseph J. Kolodka

(57) ABSTRACT

A television (TV) includes a circuit board (PCB) into which a digital video interface (DVI) receiver integrated circuit (IC) may optionally be mounted, and also includes other video sources. The TV includes a processor or controller which controls its operation, and also includes an analog switch coupled to the analog sources and to the PCB at the receiver, for switching among video sources. A scan port of the IC is coupled by way of a resistor to a general purpose I/O (GPIO) port of the switch, for indicating the presence of DVI video. The resistor has a value which places a logic low at the GPIO port when the optional receiver is present, and to allow the GPIO port to be pulled high when it is absent. A controller determines the presence or absence of the optional DVI IC by examining the logic state of the GPIO port.

10 Claims, 2 Drawing Sheets

POWER-ON DETECTION OF DVI RECEIVER IC

CROSS REFERENCE TO RELATED APPLICATIONS

This application claims the benefit of the priority of Provisional application 60/370,013 filed Apr. 3, 2002.

FIELD OF THE INVENTION

This invention is in the field of video display, and an embodiment is in the television field.

BACKGROUND OF THE INVENTION

Modern television receivers and other video display devices are marketed in an environment which is highly competitive both as to cost and technical excellence. Consequently, it is very important to provide various functions with the least costly techniques. It continues to be desirable to provide television receivers with tuners for reception of radio-frequency signals, as from an antenna or a cable television system. In addition, many television receivers are fitted with video input ports for accepting various forms of baseband analog video such as S-video, RGB, or composite video. These inputs make it convenient to display the video from sources such as video cameras.

A Digital Visual Interface (DVI) has been developed by the Digital Display Working Group, Attn. DDWG Administrator, M//s JF3-362, 2111 NE 25th Avenue, Hillsboro, Oreg. 97124-5961. The DVI specification is available on-line at www.ddwg.org, and is directed toward a high-speed digital connection for visual data. It would be desirable to provide television receivers and monitors with the additional capability accepting and processing DVI video, to allow DVI video, as from video disk players, to be viewed. Among the products which are available for use with the DVI interface is an integrated-circuit DVI receiver/CRT controller, which converts DVI signals into analog video and 2H synchronizing signals. This integrated-circuit DVI receiver is type SiI907 or Sil 907, manufactured by Silicon Image, Inc., of Sunnyvale, Calif. It should be noted that "2H" represents a frequency equal to twice the standard NTSC horizontal frequency of about 15,734 Hz.

For cost and marketing reasons, not all television receivers can be fitted with DVI receivers. One inexpensive way to make a variety of television receivers is to use a common printed-circuit board for the main processing portion of all the television receivers of a group of related receivers, and to simply "leave out" the DVI receiver from those printed-circuit boards which are destined for use in low-priced television receivers. The placement of electrical components on a printed-circuit board is known as "population," and while "depopulation" strictly speaking might suggest actual removal of a component, it can also be applied to intentional failure to place a given component in the board during assembly. Thus, one way to make a given model of a television receiver is to have a common printed circuit board for a processing portion, and to either populate or depopulate the board with the DVI receiver, in accordance with the desired subset of the model.

Many television receivers include microprocessor-based controllers. In order for the various subsets of a given model to operate, the microprocessor or controller must know whether a particular component, such as the DVI receiver, is installed or not installed, so that appropriate control can be effectuated. If the DVI receiver is installed, the microprocessor may also need to know if DVI video is presently or currently applied to the installed DVI circuitry.

SUMMARY OF THE INVENTION

A video display apparatus according to an aspect of the invention comprises a signal processor having an input for processing one of video information and audio information. A detector is provided for generating at a terminal, during a first interval, a signal that is selectively indicative of a presence of the detector, when the detector is present, and of an absence of the detector, when the detector is absent. The detector, when present, is responsive to the input signal for generating at the same terminal, during a second interval that is different from the first interval, a signal that is selectively indicative of a presence at the input of an input signal, when the input signal is present, and of an absence of the input signal, when the input signal is absent. A controller responsive to the signals that are generated at the terminal controls a mode of operation of the signal processor. In one version of this aspect of the invention, both the detector and at least a portion of the signal processor are included in a common integrated circuit. The input signal may comprise a DVI signal. The detector may be responsive to a selection signal, during a start-up time interval, for generating the signal that is indicative of the presence and absence, respectively, of the detector. The detector of the video display apparatus may include a semiconductor that actively drives the terminal, during the first interval, when the detector is present, and wherein a signal is generated at the terminal in a passive manner, when the detector is absent. The signal that is indicative of the absence of the detector is generated by a pull-up resistor.

DESCRIPTION OF THE INVENTION

Figure 1:
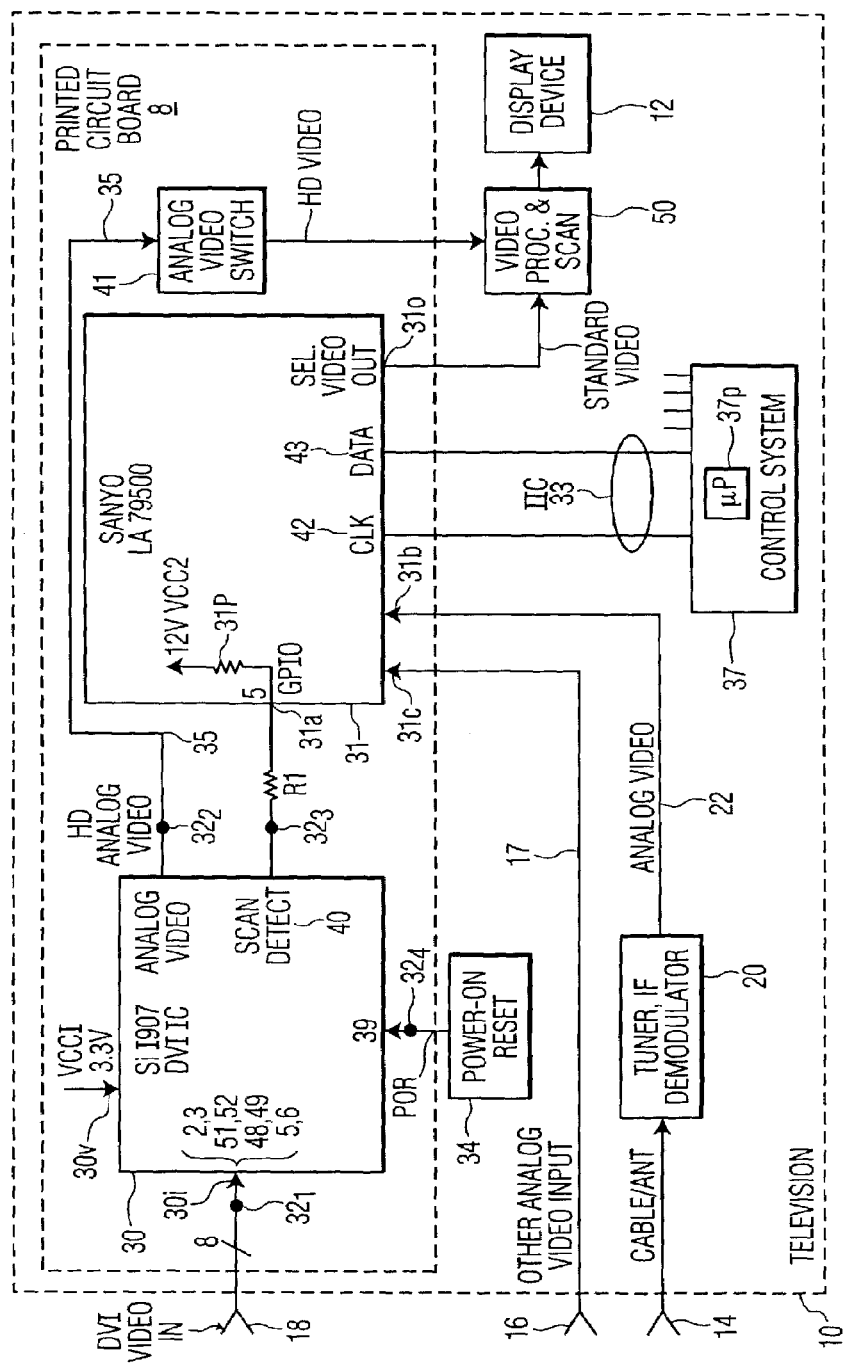
FIG. 1 is a simplified block diagram of a television receiver according to an aspect of the invention.

In FIG. 1, a television receiver designated generally as 10 includes a display device 12, which displays the content of the video arriving at the television receiver 10 by way of a radio frequency (RF) input port 14, by way of an analog video port 16, or a digital DVI port 18. The RF signal, if applied to RF port 14, is coupled to a block 20, which represents a tuner, intermediate-frequency (IF) amplifier, and demodulator, all well known in the art, for selecting an RF carrier, and for extracting analog video signals from that carrier. The resulting analog video, if present, is applied over a signal path 22 to an input port 31b of an analog video switch designated 31. Analog video which is not modulated onto an RF carrier may be applied by way of input port 16 and another analog video path 17 to another input port 31c of video switch 31. The selected one of the analog video signals is coupled from an output port 31o of analog switch 31 to conventional video processing and scanning, illustrated as a block 50, for producing a display on display device 12.

If DVI digital signals are available, they may be applied by way of port 18 and an electrically conductive printed-circuit path or pad $32_1$ of a printed-circuit board 8 of television receiver 10 of FIG. 1 to an input port 30*i* of an integrated-circuit DVI receiver 30, which is a type Si I907. Integrated-circuit DVI receiver 30 is energized by direct voltage applied to its Vcc input terminal 30*v*. As mentioned, integrated-circuit DVI receiver 30 may be either installed or not installed in any particular receiver. Integrated-circuit DVI receiver 30, when present in television receiver 10, receives DVI video from printed-circuit board 8 input conductive pad(s) $32_2$ at its pin pairs 2, 3; 51, 52; 48, 49; 5, 6, and converts the digital video into analog video, which is made available at a printed-circuit output conductive pad $32_2$ for further use. If analog switch 31 is capable of handling the high-definition video produced at port $32_2$ of DVI receiver integrated circuit 30, the analog signal can be coupled to an analog signal input port of the switch integrated circuit 31. In the illustrated embodiment, switch integrated circuit 31 is not rated for use with the DVI video, which is at 2H, so the DVI video is routed from analog video output port $32_2$ of DVI receiver integrated circuit 30 by way of a path 35 to another analog switch illustrated as a block 41 and thence to video processing and scan block 50.

On the other hand, if DVI receiver integrated circuit 30 is not installed, any DVI video which might be applied to port 18 goes no farther than conductive pad $32_1$. If installed, DVI receiver 30 also includes a scan detect pin 40, at which a logic high level appears during operation when DVI video is present, and at which a logic low level appears when DVI video is not present. Printed-circuit pad $32_3$ is connected by way of a coupling resistor R1 to general-purpose input/output (GPIO) pin 5 of switch IC 31. DVI receiver 30 further includes a Reset pin 39, which, according to the manufacturer, must be held low for at least 100 nanoseconds (ns) after power-on to select the proper mode of the internal de-jitter circuit. For high-bandwidth digital content protection, reset pin 39 should be connected to an external power-on-circuit, which causes the pin 39 signal to go high after the required low period.

In a particular embodiment, multiport switch integrated circuit, illustrated as a block 31, is a type LA79500 6-input 3-output audio-video switch, manufactured by Sanyo Electric Co. The scan detect signal produced at pin 40 of DVI receiver integrated circuit 30 is applied, by way of a conductive pad $32_3$, to an input port 31*a* of switch IC 31, corresponding to a general-purpose input-output (GPIO) pin 5 of IC 31. As illustrated in FIG. 1, pin 5 of switch IC 31 is internally connected, by way of a pull-up resistor designated as 31P, to the 12-volt Vcc2 supply. The selected standard video is coupled to the selected video output port 31*o* for application to further video processing and scan generation, illustrated together as a block 50, and for ultimate display by device 12.

A control system 37, illustrated in FIG. 1 as containing a microprocessor (:P) 37P, is coupled to various portions of the television apparatus 10 for control thereof, and in particular is coupled by way of a standard Philips-type I²C bus 33 to CLK pin 42 and data pin 43 of switch integrated circuit 31, for monitoring and controlling the switch.

An attribute of DVI receiver IC 30 of FIG. 1 is that, in response to an active logic low applied to the reset input pin 39 of DVI receiver integrated circuit 30, the state of scan detect pin 40 is forced to a logic low state.

Figure 2A:
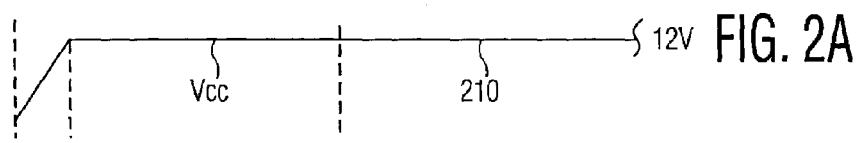
FIG. 2 includes FIG. 2a, which is a time line representing the application of energizing voltage following power-on, FIG. 2b, which is a time line representing the power-on signal, FIG. 2c, which is a time line representing the GPIO signal in the presence of a DVI receiver IC and DVI video, FIG. 2d, which is a time line representing the GPIO signal in the presence of a DVI receiver IC and no DVI video, and FIG. 2e, which is a time line representing the GPIO signal in the absence of a DVI receiver IC.
Figure 2B:
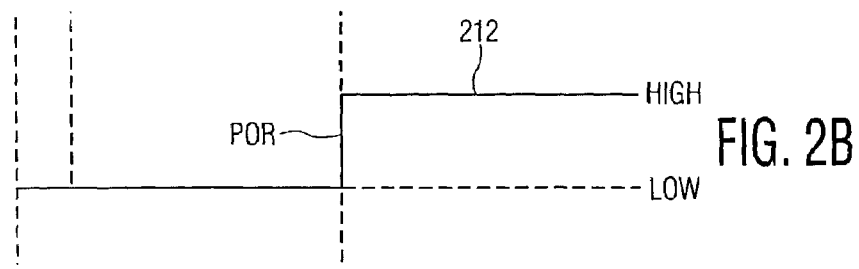
Figure 2C:
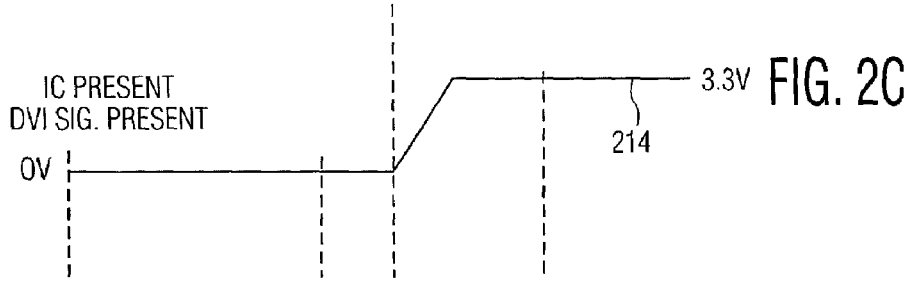
Figure 2D:
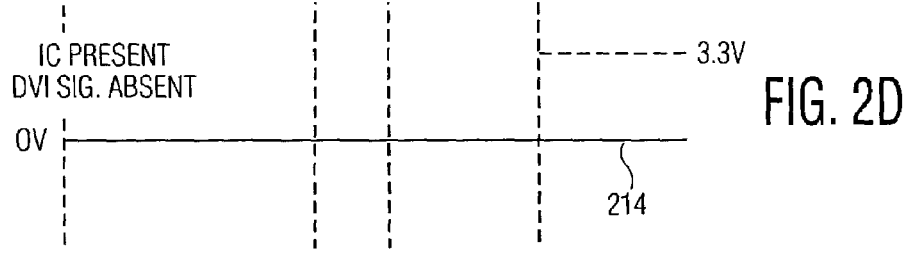

The power-on attributes of the DVI integrated circuit receiver 30 are used to determine the presence or absence of the IC in the television receiver 10. In accordance with an aspect of the invention, a Power-On Reset arrangement illustrated as a block 34 in FIG. 1 produces a power-on reset (POR) signal which has an active logic low level during an initial interval following power-on, and, following the initial interval, goes to a high impedance or inactive logic high state. The initial interval during which the POR signal is an active logic low is the interval t0 through t8 in FIG. 2. The term "FIG. 2" is taken to mean the grouping of FIGS. 2*a*, 2*b*, 2*c*, 2*d*, and 2*e*. More particularly, at power-on, illustrated as relating to the time interval t0 to t2 of FIG. 2, the applied voltages Vcc1 and Vcc2, either of which is represented by waveform 210, are applied to integrated circuits 30 and 31, respectively, of FIG. 1. After time t2 of FIG. 2, the applied voltage 210 is deemed to have reached its full value, so that the integrated circuits are operational. The time-dependent power-on reset (POR) signal is illustrated as 212 in FIG. 2*b*. POR signal 212 is at an active low level from time t0 until time t8 in FIG. 2, and takes on an inactive logic high level (an open circuit) at all times thereafter.

According to an aspect of the invention, a determination of the presence or absence of the DVI receiver IC 30 in the printed-circuit board 8 of FIG. 1 is made at a time, such as the time t6, lying between times t0 and t8 of FIG. 2. More particularly, at a time lying between times t0 and t2 of FIG. 2, the power-on reset circuit 34 of FIG. 1 produces an active logic low level, as illustrated by waveform 212 in FIG. 2*b*, and applies the logic low level to Reset pin 39 of DVI receiver IC 30 of FIG. 1. If the IC 30 is present in printed-circuit board 8, the logic low level applied to reset pin 39 during the interval t0 through t8 causes a semiconductor, not illustrated, to actively drive scan detect pin 40 to a logic low level, as suggested by waveform 214 of FIG. 2*c*. The value of resistor R1 is selected in conjunction with the value of internal pull-up resistor 31P of switch integrated circuit 31 so that an active logic low level applied to pad $32_3$ causes GPIO pin 5 to assume a logic low level, but if an inactive logic high level (an open circuit) is applied to pad $32_3$, GPIO pin 5 assumes a logic high level. In one embodiment, the value of resistor R1 is selected to be 3300 ohms. At time t6, control system 37 of FIG. 1 interrogates switch 31 by way of IIC bus 33 as part of a polling function, and determines the state of GPIO pin 5 of the switch 31. If the state of pin 5 is low at time t6, DVI receiver IC 30 is deemed to be present. Controller 37 can thereafter control the operation of the television 10 of FIG. 1 in accordance with the known presence of the DVI receiver. On the other hand, if GPIO pin 5 of switch IC 31 is found to be passively at a logic high at time t6, as illustrated by waveform 214 of FIG. 2*e*, then the DVI receiver IC 30 is deemed to be absent.

If the DVI receiver IC 30 of FIG. 1 is deemed to be present, the controller may go on to determine the presence or absence of DVI signal applied to the DVI receiver IC. This is accomplished by determining the logic state of GPIO pin 5 of switch IC 31 at a time such as time t10 of FIG. 2, in response to the scan detect signal produced at pin 40 of the DVI receiver IC 30 of FIG. 1. Time t10 can occur at any time following time t8, and may occur more than once, as DVI video may become present and absent during normal operation. More particularly, the Si I907 integrated circuit DVI receiver produces an active logic high level at pin 40 in the presence of DVI signal, and an active logic low level in the absence of DVI signal. In the presence of DVI signal, the signal 214 of FIG. 2*c* will go to a logic high level when the DVI receiver IC 30 is present and DVI signal is present. On the other hand, if the DVI integrated circuit 30 is present but DVI video is not present, the GPIO pin 5 of switch 31 of FIG. 1 will take on a logic high state, as suggested by waveform 214 of FIG. 2d at time t10. Examination of the state of GPIO pin 5 of switch 31 of FIG. 1 at time t10 (or any subsequent time) will reveal the presence or absence of DVI video.

In carrying out an inventive feature, the presence or absence of integrated circuit 30 is determined by examining the signal at input port 31a (pin 5) of switch 31, and the presence or absence of DVI signals is determined by examining the signal at the same port 31a or pin 5 of switch 31.

Figure 2E:
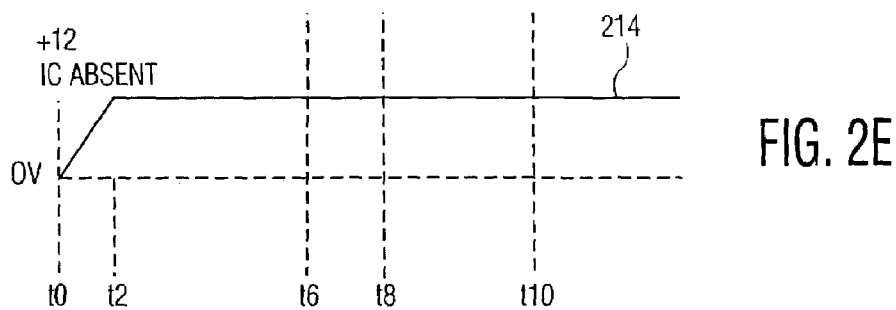

FIG. 2e illustrates the state of GPIO pin 5 of switch 31 of FIG. 1 when the DVI receiver integrated circuit 30 of FIG. 1 is not in the printed circuit board 8. More particularly, since there is no DVI receiver IC present, there is nothing to prevent the pull-up of pin 5 to a logic high state by resistor 31P. The presence or absence of DVI video is irrelevant, since it cannot be decoded for lack of a receiver IC. Thus, controller 37 of FIG. 1 may either not make the determination of the presence or absence of DVI video if the DVI receiver IC is absent, or if the determination of the presence of DVI video is made, the results may be ignored as not being meaningful.

What is claimed is:

1. A video display apparatus, comprising:
    a signal processor having an input for processing one of video information and audio information;
    a detector for generating at a terminal, during a first interval, a signal that is selectively indicative of a presence of said detector, when said detector is present, and of an absence of said detector, when said detector is absent, said detector, when present, being responsive to said input signal for generating at the same terminal, during a second interval that is different from said first interval, a signal that is selectively indicative of a presence at said input of an input signal, when said input signal is present, and of an absence of said input signal, when said input signal is absent, and
    a controller responsive to said signals that are generated at said terminal for controlling a mode of operation of said signal processor.

2. The video display apparatus according to claim 1, wherein both said detector and at least a portion of said signal processor are included in a common integrated circuit.

3. The video display apparatus according to claim 1, wherein said input signal comprises a DVI signal.

4. The video display apparatus according to claim 1, wherein said detector is responsive to a selection signal, during a start-up time interval, for generating said signal that is indicative of the presence and absence, respectively, of said detector.

5. The video display apparatus according to claim 1, wherein said detector includes a semiconductor that actively drives said terminal, during said first interval, when said detector is present, and wherein a signal is generated at said terminal in a passive manner, when said detector is absent.

6. The video display apparatus according to claim 1, wherein the signal that is indicative of the absence of said detector is generated by a pull-up resistor.

7. A system comprising:
    a processor including a terminal for receiving at least a first signal, and operative in response to said first signal for determining the existence or nonexistence of a receiver circuit installed in the system, and responsive to reception of a second signal at said terminal for determining the existence or nonexistence of a particular signal applied to said receiver circuit installed.

8. The system according to claim 7, wherein the system includes a video display apparatus.

9. The system according to claim 7, wherein said input signal comprises a DVI signal.

10. The system according to claim 7, wherein said receiver circuit comprises an integrated circuit for a DVI.

* * * * *